United States Patent [19]

DeSantis

[11] 4,016,296

[45] Apr. 5, 1977

[54] ANIMAL FEED BLOCK

[75] Inventor: Stanislao A. DeSantis, Rolling Hills, Calif.

[73] Assignee: Milo Don Appleman, Los Angeles, Calif. ; a part interest

[22] Filed: Mar. 18, 1976

[21] Appl. No.: 668,225

[52] U.S. Cl. .................................. 426/69; 426/103; 426/630; 426/658; 426/807

[51] Int. Cl.² .......................................... A23K 1/22

[58] Field of Search ............ 426/74, 103, 658, 649, 426/69, 630, 807, 623, 635

[56] References Cited

UNITED STATES PATENTS

| | | | |
|---|---|---|---|
| 3,010,828 | 11/1961 | Patterson et al. ................. | 426/635 |
| 3,420,672 | 1/1969 | Appleman ......................... | 426/658 |
| 3,901,976 | 8/1975 | Roth et al. ........................ | 426/658 |

Primary Examiner—R. B. Penland
Attorney, Agent, or Firm—Donald Diamond

[57] ABSTRACT

In the preparation of an animal feed block, molasses and a water absorbent clay such as attapulgite clay are subjected to high speed shearing action to obtain a dispersion thereof and thereafter the dispersion is mixed with a water binding agent such as calcium sulfate hemihydrate, a hard metallic soap former such as calcium oxide, a fatty acid soap former such as yellow grease and one or more of the following: natural protein source such as cottonseed meal, non-protein nitrogen source such as urea, a phosphorous source such as phosphoric acid, and fat such as tallow to thereby obtain a nutrient composition which sets to a hard block.

14 Claims, No Drawings

ANIMAL FEED BLOCK

BACKGROUND

This invention relates to animal feed and, more particularly, to animal feed in hard, block form.

In range land, for much of the year, only dry grass is available for providing carbohydrates and some protein to grazing animals. This dry grass does not provide the requisite amount of protein and fat to enable grazing animals such as range cattle to put on good gain and finish. Accordingly, there is a significant need for an economical, high energy, nutritionally balanced, hard, climatically stable, animal feed block which can be placed on range land for utilization as animal feed.

It is known in the art to prepare hard, animal feed blocks by, for example, (a) compressing and molding a mix of hay, straw, grains and the like, with or without molasses, to a desired shape and weight or (b) by heating and evaporating water from a molasses-fat-urea mixture, usually under vacuum conditions, with the resulting mix setting, on cooling, to a hard form. In U.S. Pat. No. 3,420,672 (Appleman, 1969), it is disclosed that gelatinized starch can be utilized as an emulsifying agent in the preparation of solid, animal feed emulsions containing molasses, fatty material, urea, phosphate, bentonite or kaolin, and other ingredients and additives.

SUMMARY OF THE INVENTION

In one aspect of this invention there is provided an animal feed block comprising molasses, water absorbent clay, water binding agent, hard soap and one or more of the following: natural protein source, non-protein nitrogen source, phosphorous source, fatty acid and fat.

In a second aspect of this invention there is provided a process for preparing an animal feed block which comprises subjecting molasses and water absorbent clay to high speed shearing action to obtain a dispersion thereof and thereafter mixing the dispersion with water binding agent, hard metallic soap former, fatty acid soap former, and one or more of the following: natural protein source, non-protein nitrogen source, phosphorous source and fat to thereby obtain a homogeneous nutrient composition which sets to a hard block.

DETAILED DESCRIPTION

Composition

Molasses, which is derived as a byproduct from the crystallization of cane or beet sugar, comprises mainly invert sugar, sucrose, water, salts and other carbohydrates. Molasses has varying amounts of solids which affects its viscosity and the measure of the amount of such solids is normally given in terms of Brix. The molasses used in this invention has a consistency varying from a relatively thin to a thick syrup and normally falls within the range of 60°–90° Brix, although molasses of 78°–88° Brix is generally preferred. The concentration of the molasses in the compositions of the invention is generally from about 25 to about 75% by weight and preferably from about 40 to about 60% by weight.

The water absorbent clays which can be employed in the invention include attapulgite clay, bentonite, kaolin and mixtures thereof as well as chemically modified clays. The clay constituent is generally present in the animal feed block in amount from about 0.5 to about 5% by weight and, preferably, in an amount from about 1 to about 2.5% by weight. Although good results are attained with each of the aforementioned clays, attapulgite clay is preferred because it produces a harder feed block.

The water binding agents which can be utilized in the invention include calcium sulfate hemihydrate, calcium chloride and mixtures thereof in an amount generally from about 0.2 to about 3% by weight and preferably from about 1 to about 2% by weight.

The hard soap which is present is formed in situ during preparation of the hard block by the reaction of a hard metallic soap former with a fatty acid soap former. The concentration of the hard soap in the feed block is generally from about 0.5 to about 10% by weight and preferably from about 1 to about 3% by weight. Hard metallic soap formers which can be utilized in the preparation of the feed block include calcium oxide, sodium hydroxide and mixtures thereof. Calcium oxide is preferred because, in addition to its basicity, it has water binding properties which facilitate the formation of a hard feed block. The fatty acid soap formers which can be employed in this invention include, for example, yellow grease, brown grease, acidulated soap stock, acidulated oils and acidulated fats. Yellow grease and brown grease are trade terms for reclaimed fats and grease which have been chemically treated to provide an acid constituency. Acidulated soap stock is the trade term for fatty acids prepared by treating soap stock with acid. Soap stock is the residue left after animal and vegetable fats and oils have been reacted with alkali to make soap. The metallic soap former is generally employed in an amount from about 0.5 to about 5% by weight and preferably in an amount from about 1 to about 3% by weight. The fatty acid soap former is generally used in amount from about 2 to about 20% by weight and preferably in an amount from about 5 to about 10% by weight.

In addition to molasses, water absorbent clay, water binding agent and hard soap, the nutrient block of this invention contains one or more of the following constituents: natural protein source, non-protein nitrogen source, phosphorous source and fatty material, with the percent by weight thereof being so selected as to make up 100 percent by weight of the finished product.

The natural protein can be obtained from various biological sources. Examples of plant sources are: cottonseed meal (approx. 40–41% protein), soybean meal (approx. 45–46% protein), peanut meal (approx. 45–47% protein), and cell cream (cell residue from the production of monosodium glutamate, approx. 75% protein). Examples of animal sources are: blood, meat and bone meal and feather meal. Natural protein may be present in the nutrient block in an amount from about 5 to about 35% by weight while a preferable concentration range is from about 15 to about 20% by weight.

Non-protein nitrogen sources include urea and ammonium salts such as ammonium sulfate. These compounds can be used at certain levels by ruminants since they are converted into protein substances in the rumen. Although non-protein nitrogen can be used alone as the source of the protein value in the formulations, it is advantageous to use the non-protein nitrogen in combination with natural protein in order to provide a product higher in potential crude protein. Non-protein nitrogen may be used in an amount from about 2 to about 10% by weight while a preferred concentration is from about 5 to about 8% by weight.

Phosphorous may be obtained from any suitable source. Examples of such sources are: monosodium phosphate ($NaH_2PO_4 \cdot H_2O$), calcium superphosphate ($CaH_4PO_4 \cdot H_2O$), ammonium phosphate and phosphoric acid. The phosphorous source may be present in an amount to provide about 0.5 to about 7% by weight of phosphorous.

Fatty material which may be employed in the feed block include fatty acids and/or fats with the latter being glyceryl esters of fatty acids. The fatty acids which may be used correspond to those herein identified as fatty acid soap formers, namely, yellow grease, brown grease, acidulated soap stock, acidulated oils and acidulated fat. When a fatty acid soap former is also being used as fatty material, it is present in excess of the amount required for hard soap formation with the excess concentration being in the range of about 1 to about 10% by weight. The fats which can be used in the nutrient block include livestock edible animal and vegetable fats and oils such as soybean oil, cottonseed oil, sesame oil, olive oil, corn oil, fish oil, grease, tallow, beef fat and the like. Fat may be present in an amount from about 1 to about 5% by weight.

Various special purpose additives may be included in the feed block such as trace minerals, vitamins, magnesium compounds, alkaline compounds, preservatives and antioxidants.

METHOD

In the following description of the method for preparing the animal feed block of this invention, the chemical nature of the ingredients and the proportions thereof are the same as those hereinabove set forth with respect to the description of the composition.

The animal feed block is prepared by subjecting the molasses and the water absorbent clay to high speed shearing action at ambient or elevated temperature to obtain a dispersion thereof. In this connection, the water absorbent clay absorbs and binds from about 5 to 10 times its weight with water from the molasses. Thereafter, the dispersion is mixed with the water binding agent, the hard metallic soap former, the fatty acid soap former, special purpose additives, and one or more of the following: natural protein source, nonprotein nitrogen source, phosphorous source and fat. While the order of addition of ingredients during the mixing step is not critical, it is advantageous to add the soap formers amongst the last ingredients so as to reduce the quantity of soap formed which is difficult to digest by ruminants.

The nutrient composition produced by the mixing step comprises a uniform dispersion of ingredients in the form of a thick liquid solution, soft sol or gel which can be poured or extruded from the mixer and which sets to a hard nutrient block in about 2 to about 24 hours. The blocks, which are climatically stable, resist melting and stratification of ingredients and, therefore, are particularly well suited for use as a range feed. The nutrient blocks of this invention can also be used in feedlots and elsewhere.

EXAMPLES

The attipulgite clay (hydrous magnesium aluminum silicate) employed in the examples was obtained from Floridin Company of Quincy, Florida. This clay, which is marketed by Floridin under the trademark MINUGEL/LF for use as a suspending agent in the preparation of liquid animal feed supplements, has the following physical properties:

| | |
|---|---|
| Color | Gray |
| Free Moisture, as produced at 230° F, % | 14 |
| pH | 8 |
| Specific Gravity | 2.4 |
| Packed Bulk Density, lb/cu ft | 45 |
| Free Fall Density, lb/cu ft | 37 |
| Wet Screen Analysis, +325 mesh, % | 10 |

The general procedure employed in the examples was to subject molasses and clay to high speed shearing action in a Waring Blender for about 1 to 4 minutes to obtain a dispersion thereof and then transfer the dispersion to a mixer and add the other ingredients, with mixing, to obtain a setable nutrient dispersion. In certain of the examples, the phosphorous source was added to the molasses/clay dispersion under high speed shearing conditions.

EXAMPLE I

This example illustrates that a hard metallic soap former and a fatty acid soap former must be present in the formulation in order to obtain a hard nutrient block.

| | Parts by weight (grams) | |
|---|---|---|
| Waring Blender | 1a | 1b |
| Molasses 78° Brix | 1,000 | 1,000 |
| Attapulgite Clay | 40 | 40 |
| (Shear 2 min.) | | |
| Mixer | | |
| (Molasses/clay) | | |
| $CaH_4(PO_4)_2 \cdot H_2O$ | 140 | 140 |
| Cottonseed meal | 600 | 600 |
| Tallow (hot) | 200 | — |
| Yellow grease (hot) | — | 200 |
| $CaSO_4 \cdot \frac{1}{2} H_2O$ | 10 | — |
| CaO | — | 10 |

Each of examples 1a and 1b contained approximately 12% protein. Example 1b, which contained calcium oxide and yellow grease, formed a hard block. Example 1a, which contained tallow and calcium sulfate hemihydrate ($CaSO_4 \cdot 1/2H_2O$) but no fatty acid or calcium oxide, did not form a hard block. Examples 1a and 1b were repeated using hot molasses (55° C) and formulation 1b produced an even harder block whereas formulation 1a did not form a hard block. Formulation 1b had the consistency of a thick slurry which would be extruded for packaging purposes on a production basis.

EXAMPLE II

This example illustrates the preparation of feed blocks containing phosphate, fatty acid and fat, increased levels of CaO and $CaSO_4 \cdot 1/2H_2O$ over that of Example I and the use of NaOH as the hard metallic soap former.

| Waring Blender | Parts by weight (grams) | | | | |
|---|---|---|---|---|---|
| | 2a | 2b | 2c | 2d | 2e |
| Molasses 78° Brix | 1,000 | 1,000 | 1,000 | 1,000 | 1,000 |
| Attapulgite clay | 40 | 40 | 40 | 40 | 40 |
| (Shear 2 min.) | | | | | |
| $H_3PO_4$ (85%) | 100 | 100 | — | — | 100 |
| $CaH_4(PO_4)_2 \cdot H_2O$ | — | — | — | 140 | — |
| $NaH_2PO_4 \cdot H_2O$ | — | — | 140 | — | — |
| (Shear 2 min.) | | | | | |
| Mixer | | | | | |
| (Molasses/clay/phosphate) | | | | | |
| Cottonseed meal | 600 | 600 | 600 | 600 | 600 |
| Tallow | 100 | — | 50 | 50 | — |
| Yellow grease (hot) | 100 | 200 | 100 | 100 | 200 |
| Vitamin mix | 10 | 10 | 10 | 10 | 10 |
| Mineral mix | 10 | 10 | 10 | 10 | 10 |
| $CaSO_4 \cdot \frac{1}{2} H_2O$ | 20 | 20 | 20 | 20 | 20 |
| CaO | 20 | 20 | 20 | 20 | — |
| NaOH | — | — | — | — | 20 |

Formulation 2b with yellow grease alone produced the hardest block. Formulations 2c and 2d containing 100 parts of fatty acid per 50 parts of fat also gave good results. Formulation 2a containing equal parts by weight of fat and fatty acid produced a satisfactory block but it was somewhat softer than the blocks prepared from formulations 2b, 2c and 2d. Formulation 2e, which contained NaOH as the hard metallic soap former, also produced a hard block.

EXAMPLE III

This example illustrates the use of cell cream as a protein constituent in the preparation of the feed block.

| Waring Blender | Parts by weight (grams) | | | |
|---|---|---|---|---|
| | 3a | 3b | 3c | 3d |
| Molasses 78% Brix (ambient) | 650 | — | — | — |
| Molasses 78° Brix (57° C) | — | 650 | 650 | 650 |
| Attapulgite clay (Shear 2 min.) | 20 | 20 | 20 | 20 |
| $H_3PO_4$ (85%) (Shear 2 min.) | 40 | 40 | 40 | 40 |
| Mixer (Molassses/clay/phosphate) | | | | |
| Cell cream | 190 | 190 | 150 | 95 |
| Cottonseed meal | — | — | 40 | 95 |
| Yellow grease (hot) | 60 | — | — | — |
| Yellow grease (ambient) | — | 60 | 60 | 60 |
| $CaSO_4 \cdot \frac{1}{2} H_2O$ | 20 | 20 | 20 | 20 |
| CaO | 20 | 20 | 20 | 20 |

Formulation 3a was highly fluid, poured readily and became hard in about 12 hours. Formulations 3b and 3c did not pour readily but could be extruded. Formulation 3d had good flow characteristics and poured readily. Each of formulations 3b, 3c and 3d became hard. The protein concentrations for 3b, 3c and 3d were approximately 14.3%, 12.8% and 11.0%, respectively.

EXAMPLE IV

This example illustrates the use of bentonite and kaolin as water absorbent clays in the preparation of hard feed blocks.

| Waring Blender | Parts by weight (grams) | |
|---|---|---|
| | 4a | 4b |
| Molasses 78° Brix (57° C) | 650 | 650 |
| Bentonite | 20 | — |
| Kaolin | — | 20 |
| (Shear 2 min.) | | |
| $H_3PO_4$ (85) | 40 | 40 |
| (Shear 2 min.) | | |
| Mixer | | |
| (Molasses/clay/phosphate) | | |
| Yellow grease | 60 | 60 |
| CaO | 20 | 20 |
| $CaSO_4 \cdot \frac{1}{2} H_2O$ | 20 | 20 |
| Cell cream | 95 | 95 |
| Cottonseed meal | 95 | 95 |

Formulations 4a and 4b were fluid, poured readily and became hard in approximately 12 hours. However, these blocks, while hard, were not as hard as feed blocks prepared with attapulgite clay.

EXAMPLE V

This example illustrates the use of a non-protein nitrogen source in combination with a natural protein source in the preparation of animal feed blocks. The non-protein nitrogen source was urea. Each 1.0% by weight of urea in the formulation is equivalent of approximately 2.8% crude protein. Thus, by including 2.0% by weight of urea in the formulation, a significant increase in protein equivalent is obtained.

| Waring Blender | Parts by weight (grams) | | | |
|---|---|---|---|---|
| | 5a | 5b | 5c | 5d |
| Molasses 78° Brix | 650 | 650 | 650 | 650 |
| Attapulgite clay | 20 | 20 | 20 | 20 |
| (Shear 2 min.) | | | | |
| $H_3PO_4$ (85%) | 40 | 40 | — | — |
| $NaH_2PO_4 \cdot H_2O$ | — | — | 70 | — |
| $CaH_4(PO_4) \cdot H_2O$ | — | — | — | 70 |
| (Shear 2 min.) | | | | |
| Mixer | | | | |
| (Molasses/clay/phosphate) | | | | |
| Yellow grease (hot) | 60 | 60 | 60 | 60 |
| CaO | 20 | 20 | 20 | 20 |
| $CaSO_4 \cdot \frac{1}{2} H_2O$ | 20 | 20 | 20 | 20 |
| Cell cream | 85 | 85 | 85 | 85 |
| Cottonseed meal | 85 | — | 85 | 85 |
| Alfafa | — | 85 | — | — |
| Urea | 20 | 20 | 20 | 20 |

Formulations 5a, 5b, 5c and 5d produced satisfactory hard blocks having approximately 15% protein value of which about two-thirds is derived from a natural protein source.

EXAMPLE VI

This example illustrates the use of non-protein nitrogen alone as the source of the protein value in the feed blocks.

| Waring Blender | Parts by weight (grams) | | |
|---|---|---|---|
| | 6a | 6b | 6c |
| Molasses 78° Brix | 685 | 695 | 675 |
| Attapulgite clay (Shear 2 min.) | 20 | 20 | 30 |
| Mixer (Molasses/clay) | | | |
| $CaH_4(PO_4)_2 \cdot H_2O$ | 70 | — | 70 |
| $H_3PO_4$ (85%) | — | 50 | — |
| Urea (46%N) | 80 | 80 | 80 |
| Mineral mix | 5 | 5 | 5 |
| $CaSO_4 \cdot \frac{1}{2}H_2O$ | 20 | 20 | 20 |
| CaO | 20 | 30 | 20 |
| Yellow grease (hot) | 100 | 100 | 100 |

Each of formulations 6a, 6b and 6c had approximately a 23 percent protein value from non-protein nitrogen and formed a hard nutrient block. However, harder blocks were obtained when mixing was carried out at a temperature above ambient.

EXAMPLE VII

This example illustrates the preparation of a hard nutrient block having a high phosphate content.

| Waring Blender | Parts by weight (grams) | | | | |
|---|---|---|---|---|---|
| | 7a | 7b | 7c | 7d | 7e |
| Molasses 88° Brix (50° C) | 255 | — | — | 130 | 130 |
| Molasses 78° Brix (50° C) | — | 260 | 260 | — | — |
| Water | — | — | — | 130 | 130 |
| Attapulgite clay (Shear 2-3 min.) | 15 | 10 | 10 | 10 | 10 |
| Mixer (Molasses/water/clay) | | | | | |
| $NaH_2PO_4 \cdot 2O$ | 155 | 155 | 155 | 155 | 155 |
| CaO | 15 | 15 | 15 | 15 | 15 |
| Yellow grease | 50 | 50 | 50 | 50 | 50 |
| $CaSO_4 \cdot \frac{1}{2}H_2O$ | 10 | 10 | 10 | 10 | 10 |
| Alfafa | — | — | 20 | — | 20 |

Each of formulations 7a, 7b, 7c, 7d and 7e produced hard feed blocks containing approximately 7% phosphorous. Although all of the phosphate in the formulation does not dissolve in the water, the phosphate is in the block and a hard "lick" type block is produced. Formulation 7a hardens in 2–4 hours while formulations 7b through 7e require from 12–36 hours to harden depending on stirring time in the mixer.

In view of the foregoing description and examples, it will become apparent to those of ordinary skill in the art that equivalent modifications thereof may be made without departing from the spirit and scope of this invention.

That which is claimed is:

1. An animal feed block comprising:
   about 25 to about 75% by wt. of molasses;
   about 0.5 to about 5% by wt. of water absorbent clay;
   about 0.2 to about 3% by wt. of water binding agent;
   about 0.5 to about 10% by wt. of hard soap; and
   a member selected from the group consisting of natural protein source in an amount from about 5 to about 35% by wt., non-protein nitrogen source in an amount from about 2 to about 10% by wt., phosphorous source in an amount from about 0.5 to about 7% by weight calculated as phosphorous, fatty acid in an amount from about 1 to about 10% by wt., fat in an amount from about 1 to about 5% by wt., and mixtures thereof to make up 100% by weight of said feed block.

2. A feed block according to claim 1 wherein the water absorbent clay is a member selected from the group consisting of attapulgite, bentonite, kaolin and mixtures thereof.

3. A feed block according to claim 2 wherein the water binding agent is a member selected from the group consisting of calcium sulfate hemihydrate, calcium chloride and mixtures thereof.

4. A feed block according to claim 3 wherein the hard soap is a member selected from the group consisting of calcium soap, sodium soap and mixtures thereof.

5. A feed block according to claim 1 wherein molasses is present in an amount from about 40 to about 60% by wt., water absorbent clay is present in an amount from about 1 to about 2.5% by wt., water binding agent is present in an amount from about 1 to 2% by wt., and hard soap is present in an amount from about 1 to about 3% by wt.

6. A feed block according to claim 5 wherein:
   the water absorbent clay is a member selected from the group consisting of attapulgite, bentonite, kaolin and mixtures thereof;
   the water binding agent is a member selected from the group consisting of calcium sulfate hemihydrate, calcium chloride and mixtures thereof; and
   the hard soap is a member selected from the group consisting of calcium soap, sodium soap and mixtures thereof.

7. A feed block according to claim 5 wherein the water absorbent clay is attapulgite, the water binding agent is calcium sulfate hemihydrate and the hard soap is calcium soap.

8. A process for preparing an animal feed block which comprises:
   subjecting about 25 to about 75% by wt. of molasses and about 0.5 to about 5% by wt. of water absorbent clay to high speed shearing action to obtain a dispersion thereof; and
   mixing the dispersion of water absorbent clay and molasses with:
   about 0.2 to about 3% by wt. of water binding agent;
   about 0.5 to about 5% by wt. of hard metallic soap former;
   about 2 to about 20% by wt. of fatty acid soap former; and
   a member selected from the group consisting of protein source in an amount from about 5 to about 35% by wt., non-protein nitrogen source in an amount from about 2 to about 10% by wt., phosphorous source in an amount from about 0.5 to about 7% by weight calculated as phosphorous, fat in an amount from about 1 to about 5% by wt. and mixtures thereof to make up 100% by wt.;
   to thereby obtain a homogeneous nutrient composition which sets to a hard block, said percents by weight herein being based on the weight of the hard block.

9. A process according to claim 8 wherein the water absorbent clay is a member selected from the group consisting of attapulgite, bentonite, kaolin and mixtures thereof.

10. A process according to claim 9 wherein the water binding agent is a member selected from the group consisting of calcium sulfate hemihydrate, calcium chloride and mixtures thereof.

11. A process according to claim 10 wherein the hard metallic soap former is a member selected from the group consisting of calcium oxide, sodium hydroxide and mixtures thereof.

12. A process according to claim 8 wherein molasses is present in an amount from about 40 to about 60% by wt., water absorbent clay is present in an amount from about 1 to about 2.5% by wt., water binding agent is present in an amount from about 1 to 2% by wt., hard metallic soap former is present in amount from about 1 to about 3% by wt., and fatty acid soap former is present in an amount from about 5 to about 10% by wt.

13. A process according to claim 12 wherein: the water absorbent clay is a member selected from the group consisting of attapulgite, bentonite, kaolin and mixtures thereof; the water binding agent is a member selected from the group consisting of calcium sulfate hemihydrate, calcium chloride and mixtures thereof; and the hard metallic soap former is a member selected from the group consisting of calcium oxide, sodium hydroxide and mixtures thereof.

14. A process according to claim 13 wherein the water absorbent clay is attapulgite, the water binding agent is calcium sulfate hemihydrate and the hard metallic soap former is calcium oxide.

* * * * *